(12) United States Patent
Gonzalez Garcia et al.

(10) Patent No.: US 12,537,476 B2
(45) Date of Patent: Jan. 27, 2026

(54) PASSIVE LOCKING SYSTEM FOR SOLAR TRACKER

(71) Applicant: TRINA SOLAR, S.L.U., Madrid (ES)

(72) Inventors: Daniel Gonzalez Garcia, Madrid (ES); Felix Sabando Fraile, Madrid (ES)

(73) Assignee: TRINA SOLAR SPAIN, S.L.U., Madrid (ES)

( * ) Notice: Subject to any disclaimer, the term of this patent is extended or adjusted under 35 U.S.C. 154(b) by 377 days.

(21) Appl. No.: 18/336,444

(22) Filed: Jun. 16, 2023

(65) Prior Publication Data

US 2024/0421754 A1 Dec. 19, 2024

(30) Foreign Application Priority Data

Jun. 14, 2023 (EP) ..................................... 23382588

(51) Int. Cl.
  *H02S 20/32* (2014.01)
(52) U.S. Cl.
  CPC .................................. *H02S 20/32* (2014.12)
(58) Field of Classification Search
  CPC . H02S 20/32; F24S 30/40; F24S 40/85; F24S 2030/19
  See application file for complete search history.

(56) References Cited

U.S. PATENT DOCUMENTS

| | | | | |
|---|---|---|---|---|
| 9,806,669 B2 * | 10/2017 | Michotte De Welle | .................... H02S 20/32 |
| 10,174,970 B2 * | 1/2019 | Grushkowitz | ........ F24S 30/425 |
| 11,711,052 B2 * | 7/2023 | Kumar | .................... H02S 20/32 136/246 |
| 11,984,841 B2 * | 5/2024 | Morin | .................... H02S 20/10 |
| 2017/0160372 A1 * | 6/2017 | Corio | .................... F24S 30/425 |
| 2017/0163208 A1 * | 6/2017 | Almy | .................... F24S 30/425 |
| 2018/0091088 A1 * | 3/2018 | Barton | ................. F24S 30/425 |
| 2018/0128515 A1 * | 5/2018 | Habdank | ............... F24S 30/425 |
| 2021/0399679 A1 * | 12/2021 | Macomber | .............. F24S 50/20 |
| 2022/0052636 A1 * | 2/2022 | Au | ......... F24S 30/425 |
| 2023/0163718 A1 * | 5/2023 | Solon | ...................... H02S 20/32 136/246 |
| 2024/0243693 A1 * | 7/2024 | Maldonado Nicolás | .................... F24S 30/425 |
| 2024/0283393 A1 * | 8/2024 | Au | ......................... H02S 20/32 |

FOREIGN PATENT DOCUMENTS

| | | | | |
|---|---|---|---|---|
| CN | 208548864 U | * | 2/2019 | |
| CN | 213305325 U | * | 5/2021 | |
| DE | 202018103053 U1 | * | 6/2018 | ............. F24S 25/10 |

* cited by examiner

*Primary Examiner* — Terrell L McKinnon
*Assistant Examiner* — Ding Y Tan
(74) *Attorney, Agent, or Firm* — LUCAS & MERCANTI, LLP (57) ABSTRACT

A passive locking system for solar trackers having a connecting rod (110), a guide lock (120) and a suspension mechanism applied to a pin (116) integral with the connecting rod (110). The connecting rod (110) is joined at a first end (112) to a rotation profile (200) of the solar tracker. The second end (114) of the connecting rod (110) has the aforementioned pin (116). The guide lock (120) is elongated, fixed to a support post and has two upper (122) and lower longitudinal edges (124) and an inner guide rail (126). The upper and lower longitudinal contours of the guide rail (126) have teeth (127) along the same. The system has a suspension mechanism that damps the movements of the pin (116) within the guide rail (126) substantially perpendicular to the contours of the rail.

15 Claims, 13 Drawing Sheets

PASSIVE LOCKING SYSTEM FOR SOLAR TRACKER

CROSS-REFERENCE TO RELATED APPLICATION

This application claims the benefit of priority from European Patent Application No. 23382588.4, filed Jun. 14, 2023, the contents of which are incorporated herein by reference.

TECHNICAL FIELD

The present invention relates to the technical field of photovoltaic energy facilities. More particularly, the invention relates to a system for passively blocking sudden unwanted movements and/or movements with excessive amplitude in solar trackers.

BACKGROUND OF THE INVENTION

In the sector of the development of photovoltaic energy, solar trackers for maximising electricity production of a photovoltaic facility by optimising the angle at which the panels receive solar radiation are known. Basically, in useful illustrative terms to better explain the context of the invention, a solar tracker is made up of a mobile structure that supports the solar panel or set of solar panels and a post or structure fixed to the ground (or any other support surface) and on which the movement of said mobile structure is articulated. Tracking systems are normally used in large solar facilities and in certain autonomous installations, such as solar trees.

Under normal operating conditions, a rotation profile that is part of the mobile support structure is rotated in a smooth and relatively slow motorised or manual motion to orient the photovoltaic panels at the desired angle with respect to the sun at all times. When these conditions change and, for example, lead to a situation of strong gusts of wind, a sail effect of the wide surface of the solar panels can cause sudden movements on a long path which, in turn, can damage the clamping and rotation mechanisms, and even cause personal injury if maintenance/installation operators or any personnel are nearby.

For this reason, it is necessary to have systems or mechanisms in place that preferably act as soon as these sudden movements occur in order to stop or block them. It is also desirable for the solar tracker to return to the relative normal operating positions of the components thereof once the cause of said sudden movement has ceased; in other words, once the force that violently caused the rotation of the entire mobile structure has disappeared, the latter can return to the normal operating conditions thereof without human intervention, meaning automatically. All this is achieved with the system of the present invention, without active drive or recovery means (motors, batteries, etc.) and in such a way that allows said system to be coupled to already existing solar trackers. The structure and shape of the different components of the locking system of the invention, along with the characteristic interconnection thereof, provide passive locking means with autonomous or automatic recovery, and in such a way that makes it relatively simple and cheap to install, as well as to repair (replacing the corresponding mechanical parts) in the case that an extremely strong wind damages any of the components.

SUMMARY OF THE INVENTION

Therefore, in light of the purpose set forth in the previous section, the object of the present invention is a passive locking system for solar trackers. The system essentially comprises a connecting rod, an elongated guide lock and a suspension mechanism that can be considered applied to a pin that is integral with the connecting rod, by a second end thereof, in the movement of said pin by the elongated guide lock. The connecting rod is joined by a first end to a rotation profile of the solar tracker in which the system of the invention is applied; this joint being provided with pivoting capacity. This pivoting capacity of the connecting rod with respect to the rotation profile occurs along an axis that is parallel to the axis of rotation of the profile. The second end of the connecting rod comprises the aforementioned pin, which is also parallel to the aforementioned axes. The guide lock is elongated and firmly fixed to a support post; said lock has two upper and lower longitudinal edges and an inner slot-shaped guide rail, such that the mutual distances between the upper, lower longitudinal edges and the upper and lower longitudinal contours of the guide rail are maintained along the entire length of the guide lock. Furthermore, said upper and lower longitudinal contours of the slot or guide rail preferably have teeth along the entire length thereof. The separation between the teeth of one contour and the other is such that the aforementioned pin of the connecting rod can move along the guide rail without being intercepted by the same. The system additionally comprises a suspension mechanism arranged in such a way that it damps the possible movements of the pin within the guide rail and makes them substantially perpendicular to the contours of said rail or slot.

The following expressions must be clarified for a better interpretation of the specification and the attached claims.

Terms such as "up", "upper", "up", "down", "lower", "down" and the like refer to the position of the components when the locking system is installed on a solar tracker and thus coincides with the conventional position understood in a general way wherein the components closest to the ground are below or lower with respect to those located closest to the solar panel.

"Regular operating position" refers to the position of any of the components of the system when it is not subjected to forces strong enough to cause the locking thereof.

According to a feature of the locking system of the invention, the suspension mechanism comprises a slider that is integral with the second end of the connecting rod. As previously mentioned, the second end of the connecting rod is the one connected to the guide lock. The slider is designed to run along (slide along) the guide lock, and therefore it comprises two upper and lower guide wheels that will respectively roll along the two upper and lower longitudinal edges of the guide lock. The connection of the guide wheels to the slider is by elastic connection means and these elastic means provide elasticity—or damping with subsequent recovery—to the possible movement of the wheels in a direction substantially perpendicular to both longitudinal edges of the guide lock when there is an external force on the solar tracker that generates said movement.

According to another feature of the system, the aforementioned elastic connection means comprise a support for the upper wheel and a support for the lower wheel and said supports are mounted in such a way that they have the ability to move substantially perpendicular to the longitudinal edges of the guide rail; furthermore, these wheel supports are connected to each other by a spring, thereby achieving the effect of suspension or damping of the vertical or transversal movements.

According to another feature of the system, the elastic connection means comprise the supports mentioned in the previous paragraph, mounted with the same perpendicular movement capacity, but instead of the single spring mentioned above, each one of them is connected by means of a respective spring, the other end of which is connected or fixed to the slider.

According to an additional feature of the system of the invention, the upper and lower wheel supports can be or consist of a plate bent into the shape of a "C" in which one of the sides or vertical sections is longer than the other. The guide wheel is mounted in the intermediate section of the "C" (the horizontal section of the letter as seen on paper). The other two sections (the vertical ones of the letter pi or terminal sections) are coupled at an elongated projection of the slider in such a way that they can slide freely on said projection (when a force perpendicular to the guide rail causes said movement, overcoming the resistance of the corresponding spring); the coupling is as follows: the short terminal section ends in a "T" and the horizontal side of that "T" passes through a through slot in the slider in such a way that said short section cannot come out, meaning the through slot is thinner than that horizontal side of the "T" but wide enough for the sliding of the vertical side of the "T" along the same. In addition, the long terminal section of the wheel support also comprises a through slot that can be threaded by the elongated projection of the slider; the elongated projection and the through slot of the slider therefore run along the same longitudinal axis to allow the support on wheels to move perpendicular to the longitudinal edges of the guide lock. Lastly, the corresponding spring will be fixed to the long terminal section of the support at the end thereof (thus, said long terminal section must be longer than the short terminal section, so as to avoid the interference by the latter with the spring itself).

According to another additional feature, the suspension mechanism can comprise two plates fixed to the connecting rod to create damping on both sides of the direction substantially perpendicular to the longitudinal edges of the guide lock. A first plate, referred to herein as an upper suspension plate, is elongated and is firmly fixed at the upper end thereof to the second end of the connecting rod. The lower end of this first plate is in sliding contact with the upper longitudinal edge of the guide lock in such a way that the flexibility and elasticity thereof absorb and recover any sudden turns of the solar tracker rotation profile transmitted by the connecting rod. The first plate, referred to as a lower suspension plate, is elongated and is also firmly fixed at the upper end thereof to the second end of the connecting rod. The lower end thereof comprises an upward bend so that it is kept in sliding contact with the lower longitudinal edge of the guide lock; acting in a similar way to the upper suspension plate, but with damping in the direction of a substantially downward force.

Another feature of the passive locking system of the invention lies in the fact that the upper suspension plate can comprise bends along the entire length thereof to facilitate the elastic absorption of a substantially upward force; in one of the preferred embodiments it comprises at least two bends. In addition, the lower end thereof comprises an upward curvature so that the latter is in sliding contact, through the outer curved part thereof, with the upper longitudinal edge of the guide lock, like a skate that slides on the same.

According to another feature of the invention, the lower suspension plate, similarly to the upper suspension plate, comprises at least one additional bend to facilitate the elastic absorption of downward forces and, likewise, the lower end thereof comprises a curvature, in this case descending so that on the outer part thereof it is in sliding contact with the lower longitudinal edge, in the sense of a skate.

According to another feature of the invention, the suspension mechanism comprises a carriage running inside the guide rail and which has teeth arranged to couple to corresponding teeth on the contours of the guide rail. The sizes of the carriage and the teeth thereof and of the guide rail and the teeth thereof are such that they allow the carriage to travel along the guide rail when there is not enough force to push said carriage perpendicularly to the aforementioned contours of the guide rail. To determine a force that is sufficient, a suspension mechanism consisting of two C-shaped plates fixed by the central part thereof to the ends of the carriage is provided, so that the upper and lower sides of the "C" come into contact with the toothed longitudinal contours of the guide rail before being elastically compressed until said sufficient force is overcome. This system can consist of a one or two C-shaped plates.

According to another feature of the invention, in the regular operating position, the upper and lower parts of the "C" are in sliding contact with the teeth of the upper and lower longitudinal contours, respectively, of the guide rail; meaning they slide along said teeth while they go along the mentioned longitudinal contours.

Another feature of the system of the invention relates to the fact that the teeth of the carriage and the teeth of the contours of the guide rail can have the shape of a shark fin.

According to yet another feature of the invention, the guide lock, and therefore the guide rail contained therein, has a curved or circular arc shape.

Another additional feature of the system of the present invention relates to the fact that the rotation profile and the connecting rod are connected by means of a lever element pivotally joined to the latter.

Lastly, according to another feature of the invention, the support post used for the guide lock is the support or support post of the solar tracker itself.

BRIEF DESCRIPTION OF THE FIGURES

The attached drawings illustrate, by way of non-limiting example, embodiments of the passive locking system for solar trackers according to the invention. In said drawings.

DETAILED DESCRIPTION OF THE INVENTION

Below, a detailed description of the invention is provided, which includes details that were not hitherto mentioned.

Figure 1:
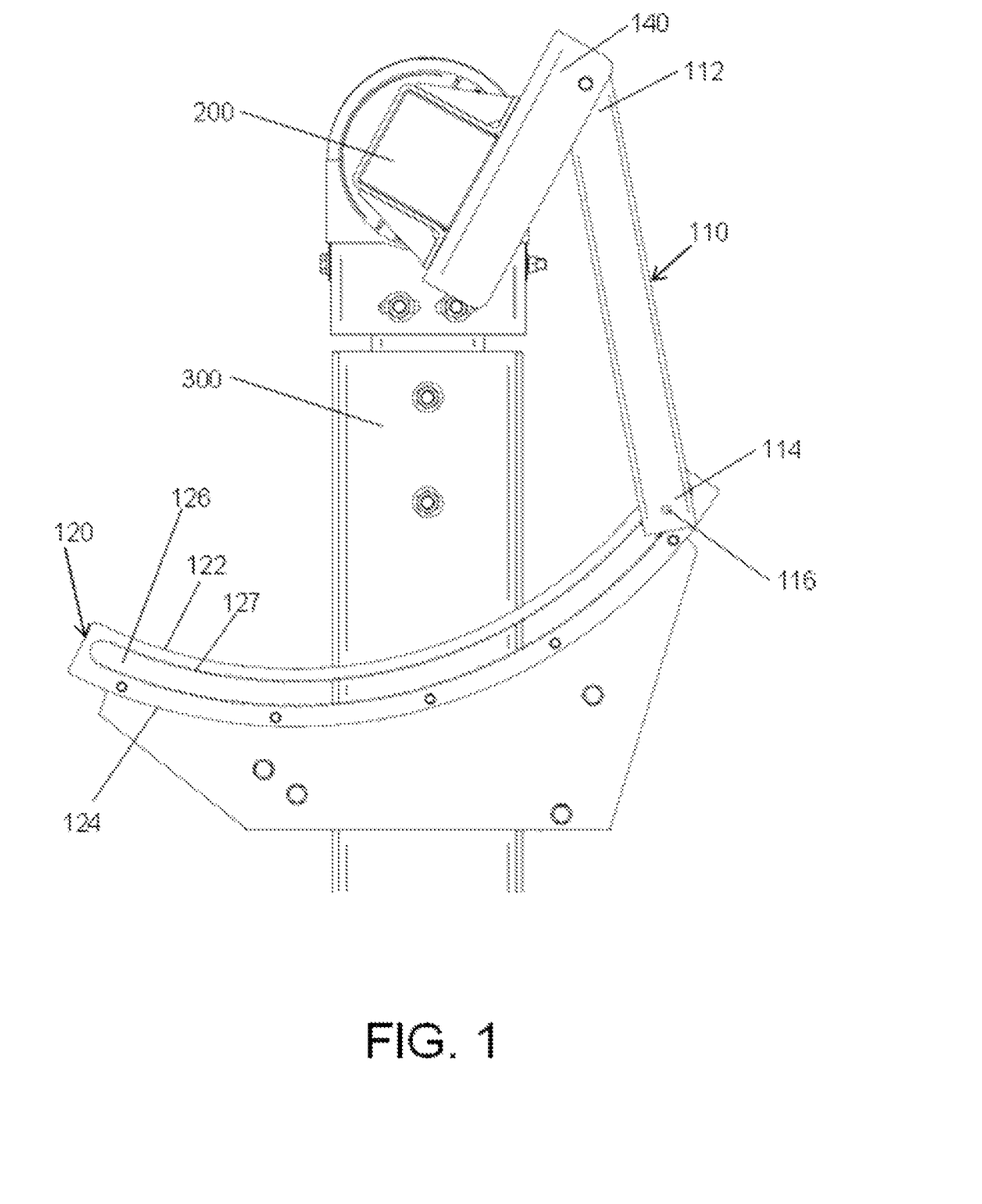
FIG. 1 is a front view of the passive locking system of the present invention.

FIG. 1 represents a passive locking system of the invention to stop or block the sudden movement of photovoltaic panels mounted on a mobile structure of a solar tracker. The system also unlocks the mobile structure when the force that caused the sudden movement ceases (winds and similar).

In this figure a rotation profile (200) can be seen from one end of the same. This rotation profile (200) is attached to or forms part of the mobile structure that supports the photovoltaic panel or panels and, therefore, will rotate on the longitudinal axis thereof when a strong wind hits the extensive surface of the solar panels. The rotation of the profile (200) will be transmitted to the connecting rod (110) (in one of the preferred embodiments, through the lever element (140). The connecting rod (110) is pivotally attached to the lever (140) at a first end (112). The rotation of the profile (200) transmitted by the connecting rod (110) will be transformed into a linear movement of the second end (114) of said connecting rod (110), given that the same is linked to a guide lock (120) by means of a pin (116). The pin (116) is substantially parallel to the axis of rotation and pivoting of the profile (200) and of the end (112) of the connecting rod, such that it passes through a guide rail (126) included in the guide lock (120). In the guide lock (120), an upper longitudinal edge (122) and a lower longitudinal edge (124) can further be distinguished. The guide rail (126) is toothed-teeth (127)—along the two contours, the upper and lower, of the slot it is formed by. During a normal rotation of the profile (200), the movement thereof will be transmitted, as previously described, to the pin (116) along the guide rail (126).

Figure 2:
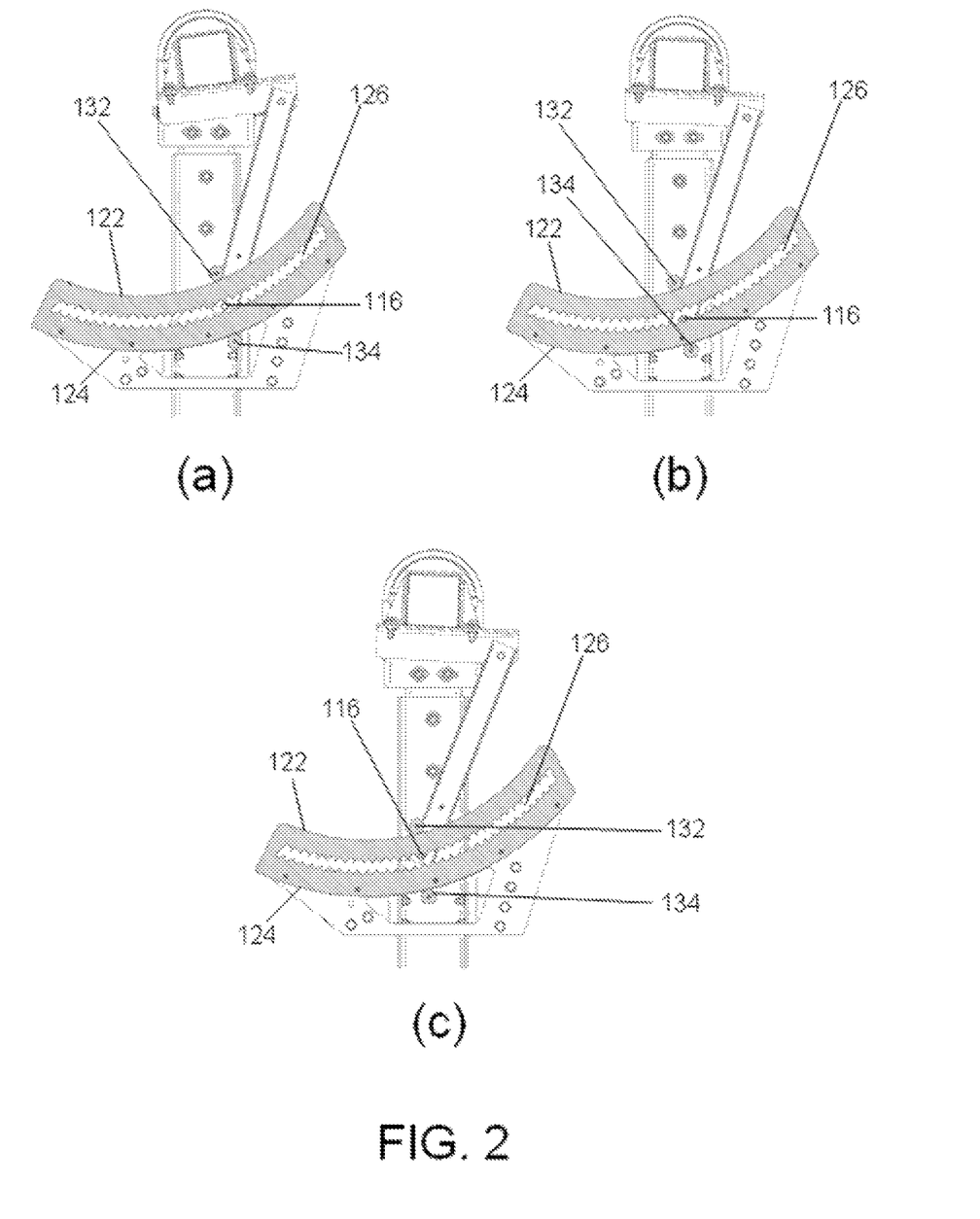
FIGS. 2(a), 2(b) and 2(c) are front views of an embodiment of the locking system of the invention in a normal operating position, a lower locked position and upper locked position, respectively.

The position corresponding to normal rotation is shown in FIG. 2(a); here it can be seen how the pin (116) is located inside the guide rail (126) in a stable location separated from the teeth (127) of the two contours of said rail (126). This position stability is achieved thanks to a suspension mechanism that keeps the pin (116) suspended within this obstacle-free path as long as there is no force (or component of force) strong enough in the direction of either the upper contour or the lower contour of the rail (126). In the case of FIG. 2, which corresponds to one of the preferred embodiments of the invention, this mechanism comprises two upper (132) and lower guide wheels (134) in rolling contact with the upper (122) and lower longitudinal edges (124), respectively, of the guide lock (120); the suspension mechanism also comprises elastic fixing means (described below) that maintain the pressure of each corresponding guide wheel (132, 134) against the respective longitudinal edge (122, 124) thereof and also maintain the positional stability of the pin (116) with the help of a slider (130), which will be described in detail later.

The concept embodied by these components and the successive concepts that will be described throughout the figures consists of translating a strong force (or force component) (and, as such, dangerous or harmful to people and components of the solar facility) perpendicular to the edges (122, 124), into a corresponding perpendicular movement of the pin (116), such that the same becomes locked in one of the recesses of the teeth (127) of the upper or lower longitudinal contour, depending on the direction of said force. These two extreme situations can be observed in FIGS. 2(b) and 2(c). In addition, as will also be explained later, as soon as that force ceases to act with the high intensity level thereof, the system will unlock itself, the entire assembly returning to the normal operating conditions of FIG. 2(a).

Figure 3:
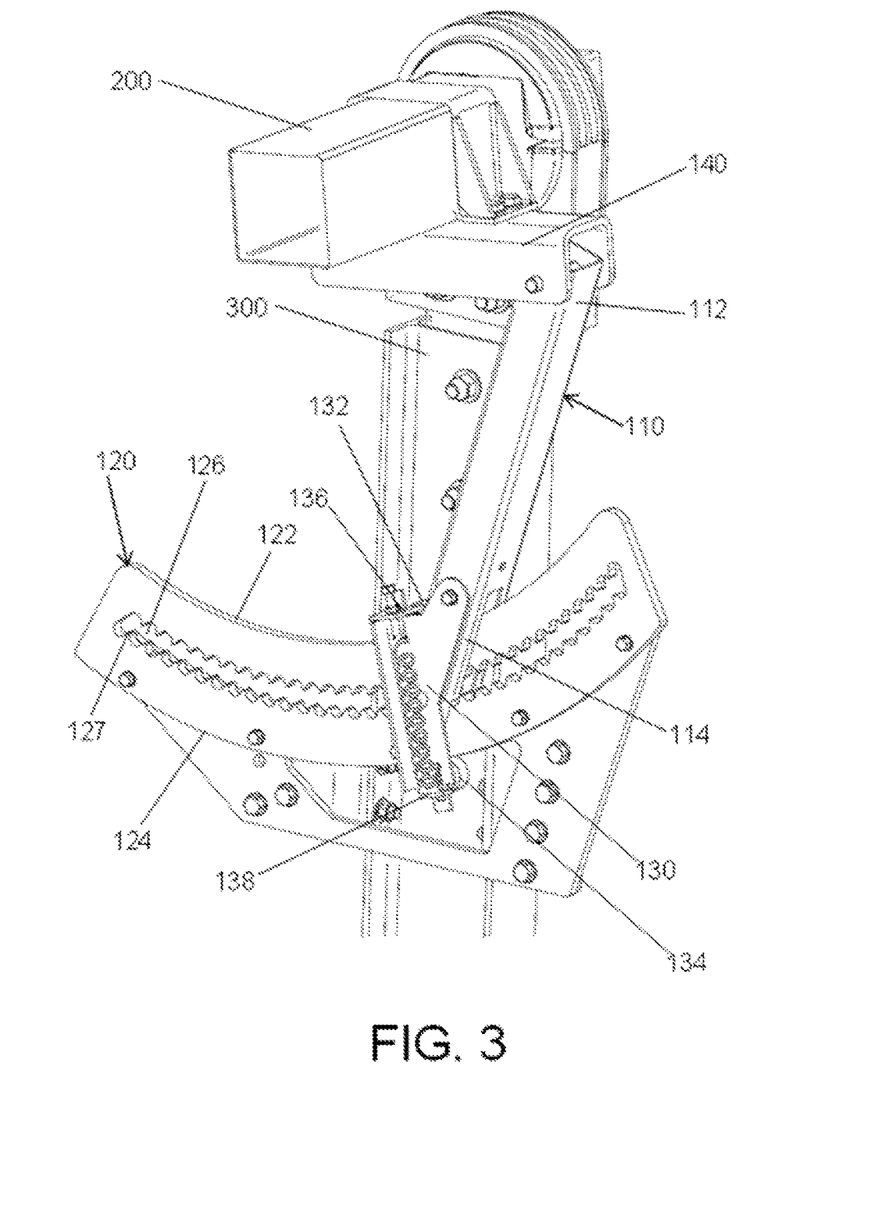
FIG. 3 is a perspective view of an embodiment of the passive locking system of the present invention.

FIG. 3 shows the suspension mechanism mentioned in the previous paragraphs in greater detail. In this case, the slider (130) can be seen, which is fixed to the end (114) of the connecting rod (110), and which includes (or is connected to) two upper (132) and lower guide wheels (134) by two corresponding upper (136) and lower wheel supports (138), which can be equal to each other. In turn, these supports (136, 138) are connected to each other by means of a spring. All these components can be better seen in FIGS. 4 to 6.

Figure 4:
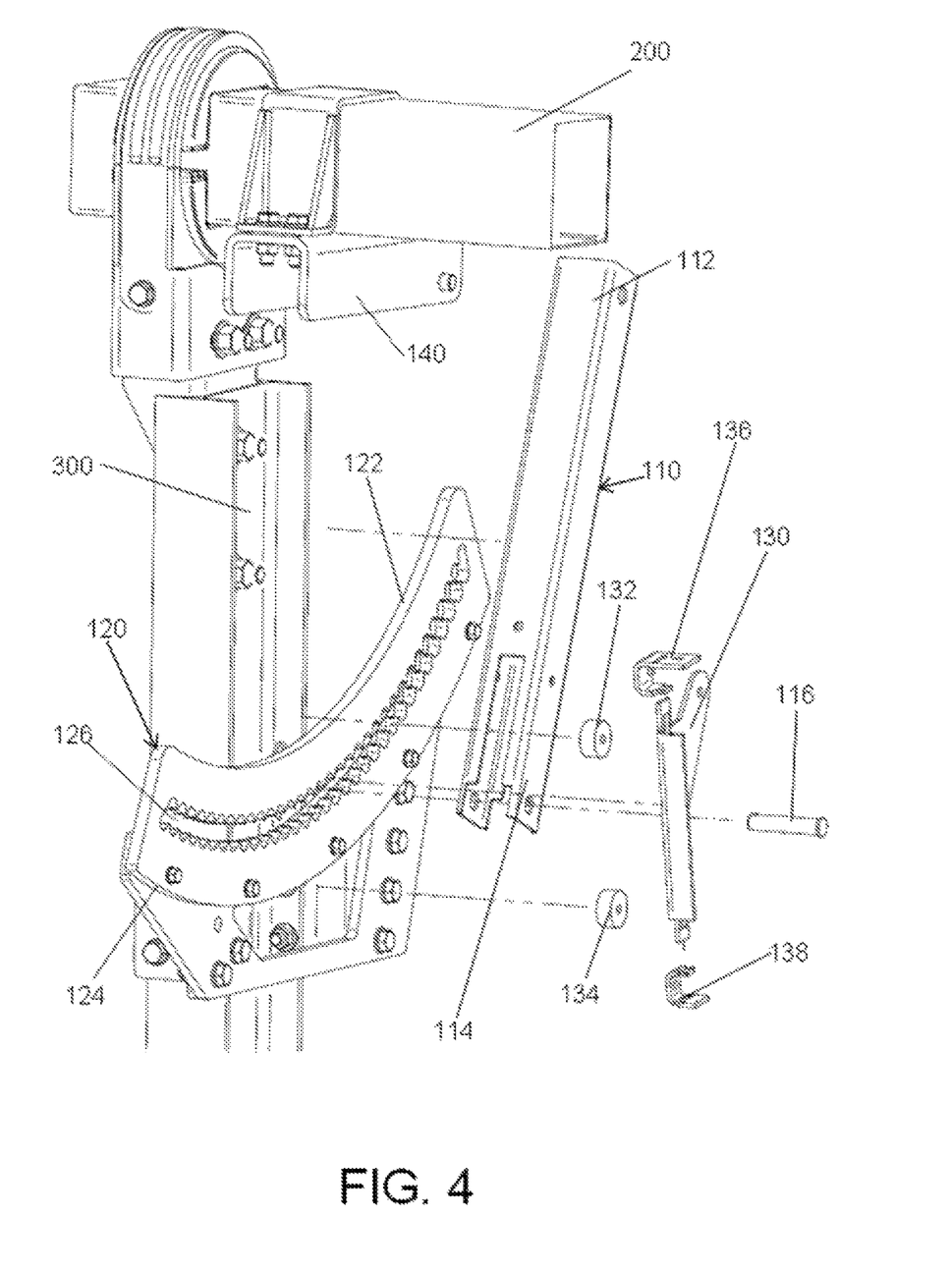
FIG. 4 is an exploded perspective view of the passive locking system of FIG. 2.
Figure 5:
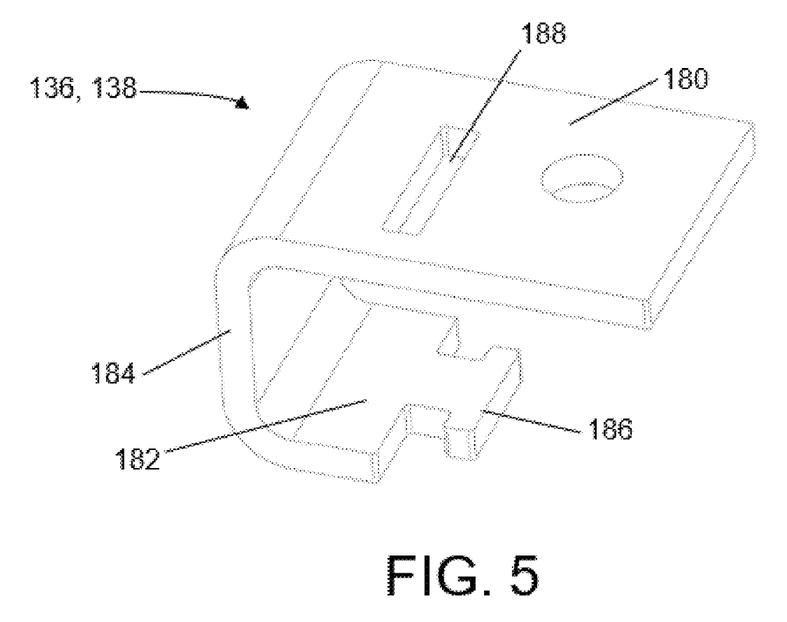
FIG. 5 is a perspective detail of a guide wheel support of one of the embodiments of the system of the invention.
Figure 6:
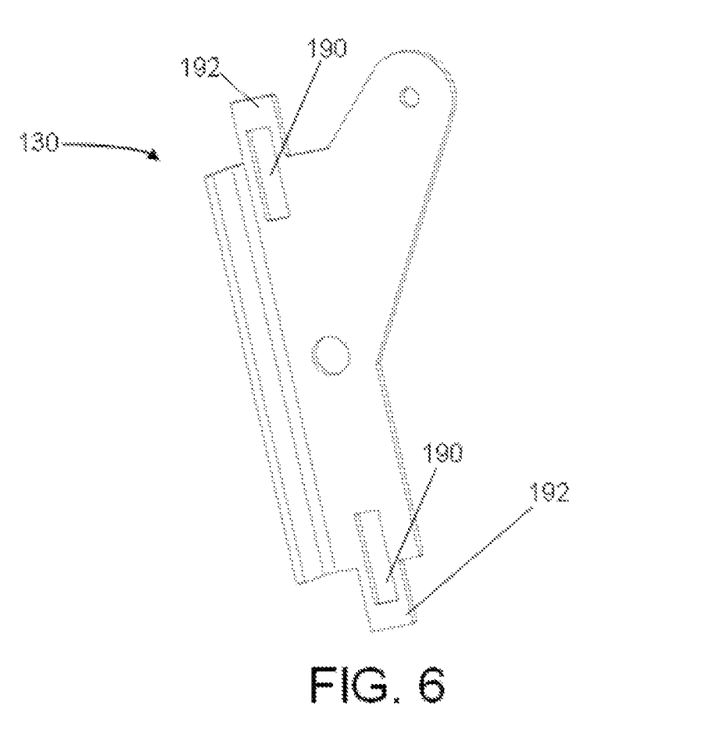
FIG. 6 is a detail in perspective of a slider of one of the embodiments of the system of the invention.
Figure 7:
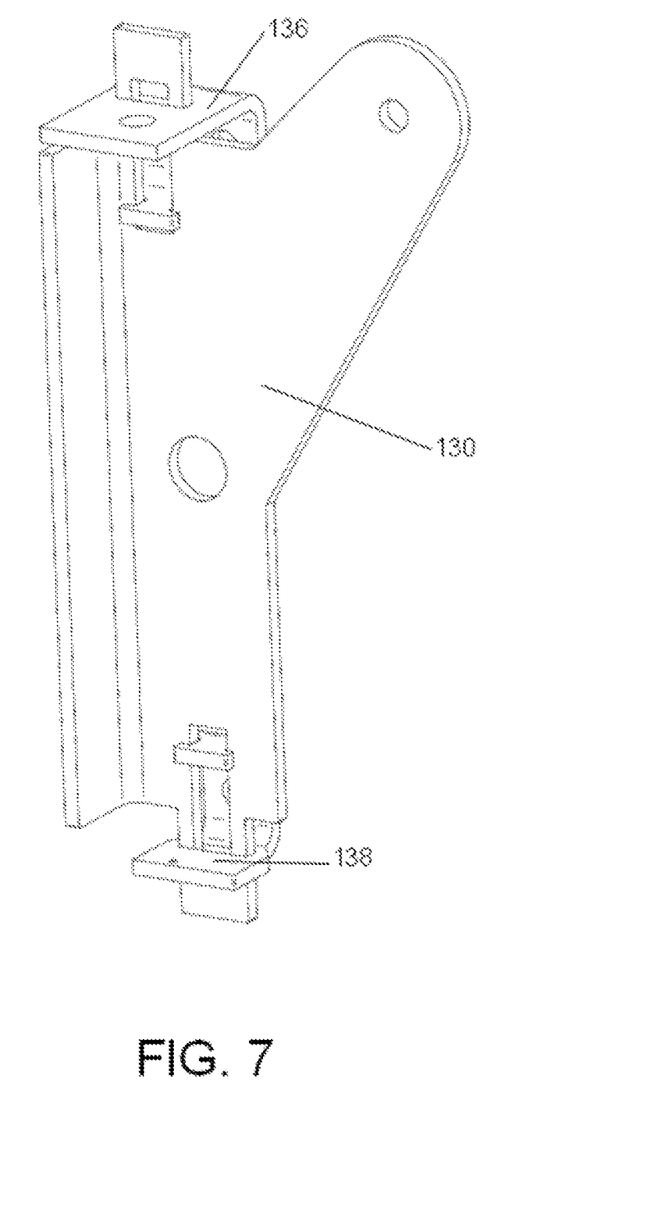
FIG. 7 is a perspective view of two wheel supports and a slider assembled together.

Specifically, FIG. 4 illustrates an exploded view of the system shown in FIG. 3 (without the spring), and FIGS. 5 and 6 show a wheel support (136, 138) and the slider (130), respectively. Starting with the latter, it can be seen how it has a hole in a lug-shaped projection to be fixed to the connecting rod (110). The specific shape of the slider (130), as well as the way of fixing it integrally to the connecting rod (110), can be any that are suitable and do not affect the scope of the invention, since they do not have any influence on the technical concept that carries out the locking and unlocking of the system described herein. In this sense, the way of achieving the suspension/damping of the pin (116) inside the rail (126) is due to the slide fixing of the guide supports (136, 138) in the elongated projections (192) and the through slots (190) comprised in the slider (130). To do so, each of the wheel supports (136, 138) comprises a through slot (188) and a T-shaped termination (186) (FIG. 5); the support (136, 138) having a generic "C" shape with one side being shorter. The through slot (188) is intended to receive the elongated projection (192) so that it can slide freely therein; the T-shaped termination (186) must go through the through slot (190) of the slider (130) so that, on one side of the slider (130), there is the horizontal segment of the "T" and, on the other side is the rest of the short section (182) of the wheel support (136, 138) (FIG. 7). Each corresponding wheel (132, 134) is rotatably fixed to the section (184) of the respective support (136, 138). In other words, a simultaneous coupling is obtained of: the T-shaped termination (186)—through slot (190) of the slider and through slot (188) of support-elongated projection (192) of the slider. Preferably, the horizontal side of the "T" of the termination (186) is longer than the width of the through slot (190) such that the termination (186) cannot be easily uncoupled from the slot (190).

Therefore, on one side of the slider (130) (according to the plane of the largest surface thereof) the horizontal side of the "T" of the termination (186) and the long section (180) of the support (136, 138) will be situated from the slot (188) to the end of that section (180), and, on the other side of the slider (130), there will mainly be the intermediate section (184) of the support (136, 138) in which the mounted guide wheel (132, 134) goes. Furthermore, each wheel (132, 134) will be supported with some pressure on the respective longitudinal edge (122, 124) thereof; in one of the embodiments, this pressure is achieved by means of a spring (as seen in FIG. 3) that joins the two wheel supports (136, 138) together, using, for example, the hole that is seen in the long section (180) of FIG. 5. The spring will keep both wheels (132, 134) pressed against the guide lock (120), and the same will not lose the vertical rolling orientation thereof with respect to the edges (122, 124) thanks to the previously explained mechanism of the through slots (188, 190), the elongated projection (192) and the T-shaped termination (186). In addition, when a high force drives the connecting rod (110) downwards, this mechanism allows this movement to be transmitted to the slider (130), which can move beyond an established limit (according to the spring used and the calculated dimensions of the guide rail (126), among others) so that the pin (116) becomes locked in one of the recesses of the teeth (127) (FIG. 2(b)). When the magnitude of this force is reduced, the spring will cause the components to return to the regular operating position thereof (FIG. 2(a)). The same will occur with a force acting in the opposite direction (FIG. 2(c)).

In a variant of the previous embodiment, the suspension mechanism can comprise two springs instead of one. In such a case, one of the springs would be fixed at one end to the long section (180) of one of the wheel supports (136, 138) and, at the other end thereof, to the slider (130) (on any suitable place of the body thereof); the other spring would be fixed to the long section (180) of the other support (138, 136) and, at the other end thereof, also to the slider (130). In this way, the suspension or damping is independently generated for each guide wheel (132, 134).

Figure 8:
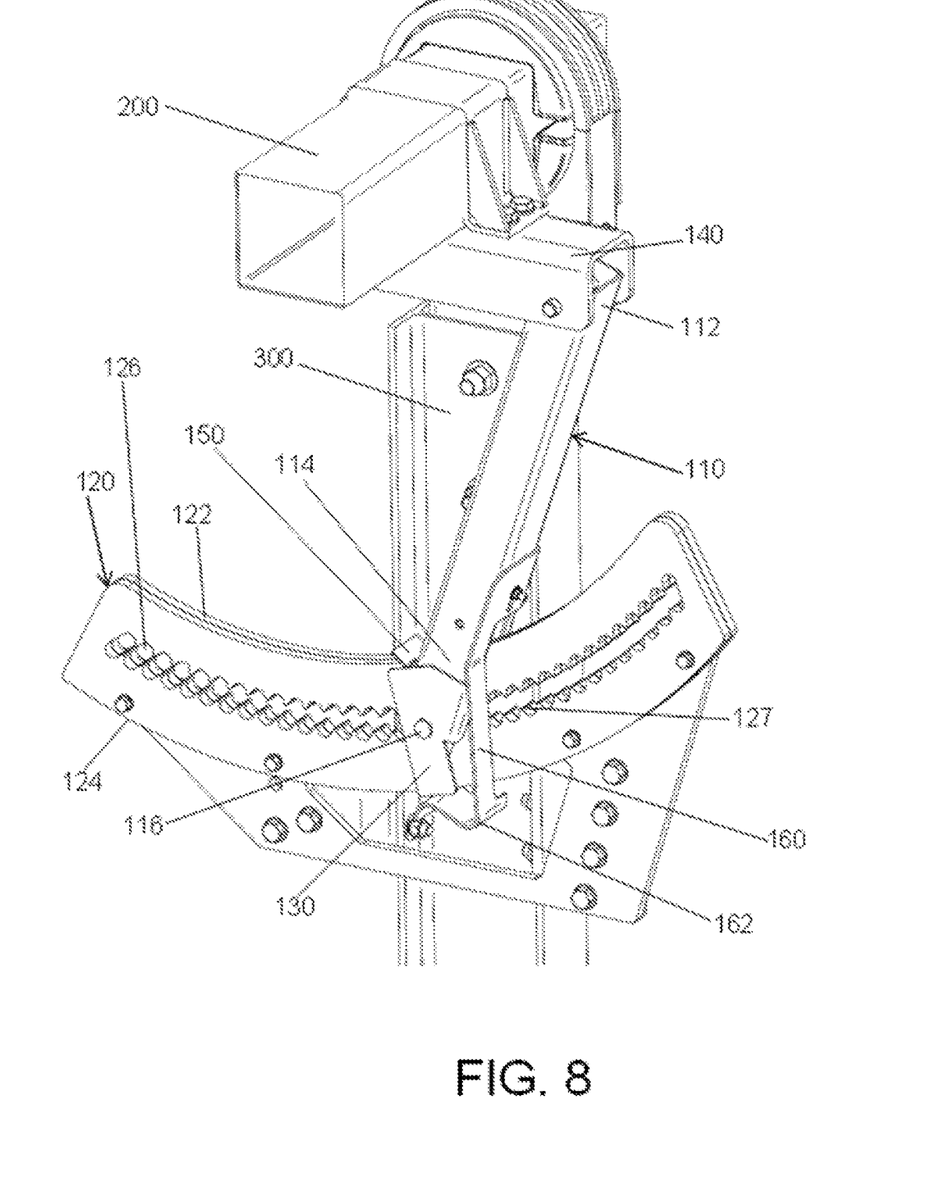
FIG. 8 is a perspective view of another embodiment of the passive locking system of the present invention.
Figure 9:
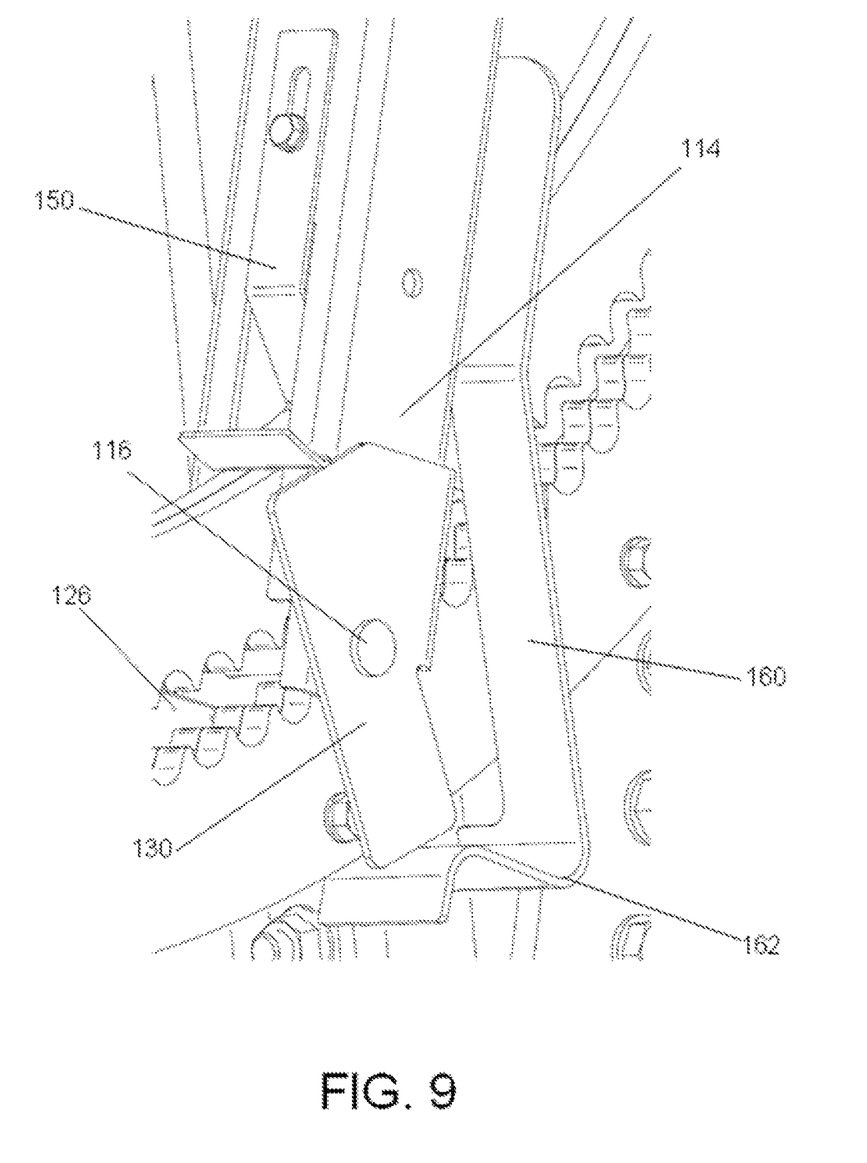
FIG. 9 is an enlarged detail, in perspective, of part of the embodiment shown in FIG. 8.

FIG. 8 shows another embodiment of the suspension mechanism of the system of the present invention. The concept is the same as the one described above in that a "safe" path is created for the pin (116) along the guide rail (126) until a force manages to overcome elastic fastening means, by which the pin (116) becomes locked in any of the recesses of the teeth (127) until said force subsides. In this case, the elastic fastening means, which replace the set of guide wheels (132, 134), the springs and the wheel supports (136, 138), are made up of two upper (150) and lower suspension plates (160). These parts can be seen in their operational context in FIG. 8, wherein the lower plate (160) and only a small part of the upper plate (150) can be clearly seen; in any case, both plates (150, 160) are firmly fixed to the end (114) of the connecting rod (110). For a better understanding of the following description, FIGS. 9 to 11 can be simultaneously consulted.

Figure 10:
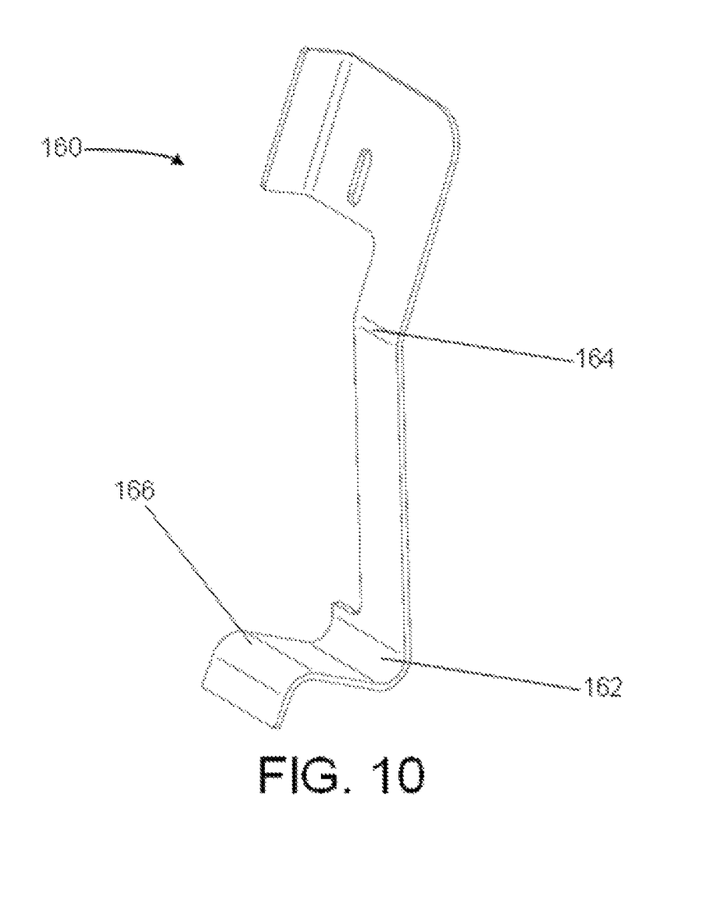
FIG. 10 is a perspective detail of a lower suspension plate of the embodiment shown in FIG. 8.
Figure 11:
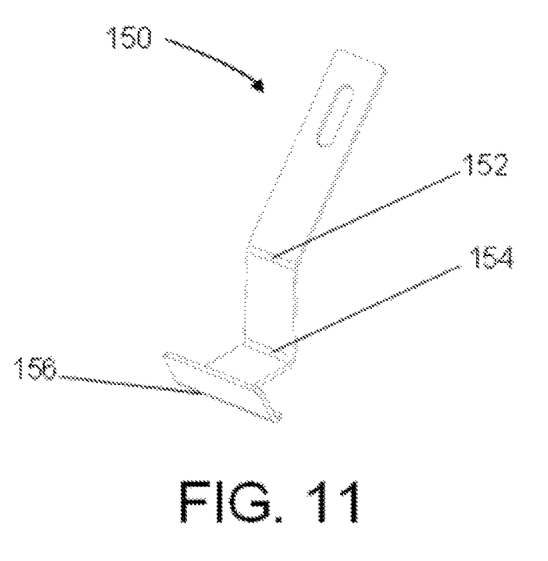
FIG. 11 is a perspective detail of an upper suspension plate of the embodiment shown in FIG. 8.

FIGS. 10 and 11 respectively show two perspective views of the lower (160) and upper suspension plates (150). The figure shows a detail of the system wherein the position and fixing of said plates (150, 160) with respect to the connecting rod (110) can be better seen. The upper plate (150) is fixed at one of the ends thereof to the connecting rod (110) and comprises two bends (152, 154) that serve to articulate the flexibility of the plate (150) and to be able to end, at the other end, in an upward curvature (156), the vertex (or area around the vertex) of which acts as a slider, sliding on the upper longitudinal edge (122) of the guide rail (126) (in a similar way to the guide wheels (132, 134) of the previously mentioned embodiments). When a downward force is produced on the connecting rod (110), the plate (160) will bend, absorbing the impulsion; when the force is too intense, the bending of the plate (160) may be such that the pin (116) becomes engaged or locked in one of the recesses of the teeth (127) of the lower contour of the guide rail (126), preventing the subsequent movement of the pin (116) along the rail (126) until the value of that force is sufficiently reduced to allow the plate (160) to recover the structural shape thereof for regular operation.

The lower suspension plate (160) acts in a similar way to that which was described above, but on the lower longitudinal edge (124) of the guide lock (120). To do so, it has at least one upward bend (162) that facilitates the support of the end thereof against the lower edge (124) of the guide lock (120); preferably, it also has another bend (164) with the aim of articulating the flexible behaviour thereof. In a similar way to that which is described above for the plate (150), the plate (160) also has a curvature (166), in this case downward, in order to create a sliding area, in the sense of a skate. The material used for these suspension plates (150, 160) can be a metal that provides sufficient strength combined with flexibility and elastic recovery features necessary to withstand the forces experienced by these mechanisms. It could be another, non-metallic material, as long as it meets the aforementioned requirements.

Figure 12:
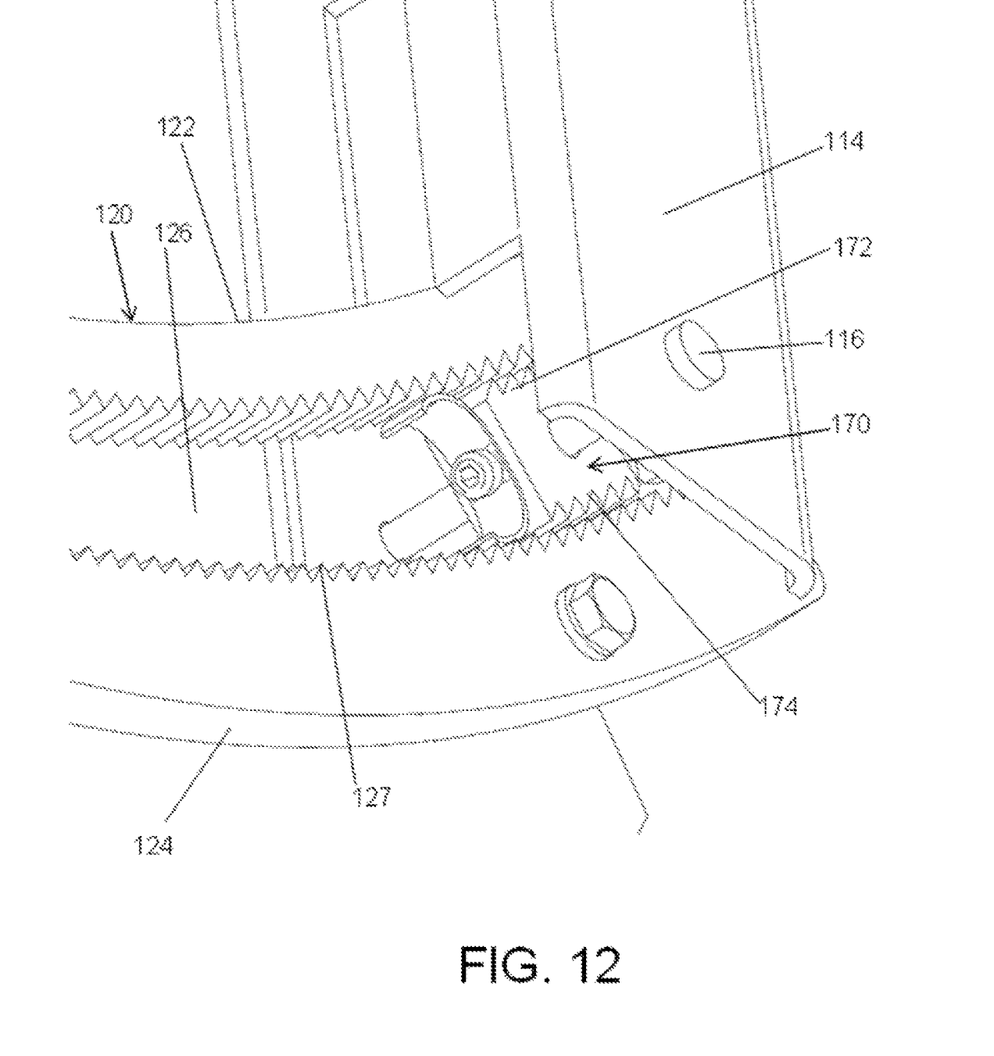
FIG. 12 is an enlarged detail, in perspective, of part of another embodiment of the present invention.
Figure 13:
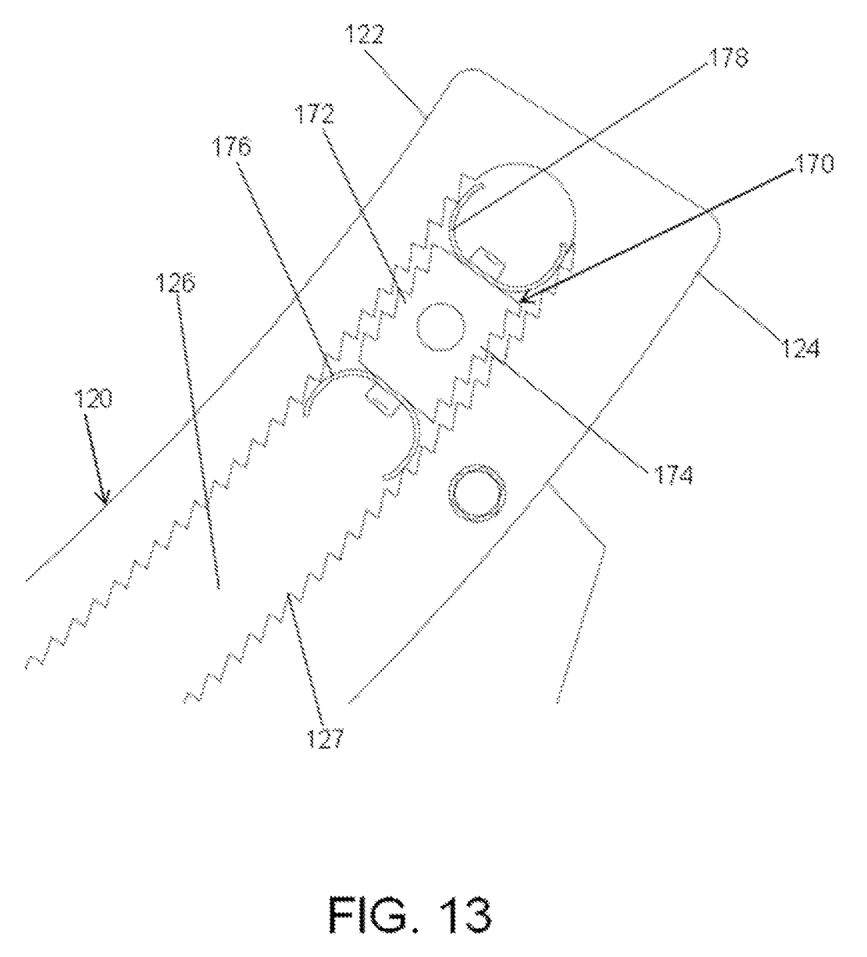
FIG. 13 is a side view of the embodiment of FIG. 12 without the connecting rod, for clarity.

FIGS. 12 and 13 show another embodiment of the suspension mechanism for the locking system of the present invention, FIG. 12 showing a detail in perspective and FIG. 13 showing a front view, without the connecting rod (110). A carriage (170) has been included in this suspension mechanism around the pin (116); the carriage (170) could be integral with the pin (116) or have a certain degree of freedom in any of the three spatial dimensions. It is important that said carriage (170) remain within the guide rail (126) and that, under normal operating conditions (without strong winds), it move along that rail (126) without being intercepted by the teeth (127) of the contours of the slot that acts as a guide rail (126). To maintain this free movement, C-shaped plates (176, 178) are provided with the central part of the "C" firmly fixed to the ends of the carriage (170) (FIGS. 12 and 13), such that a small or medium force (in any case, through experimentation and/or calculation, the appropriate components and materials can be chosen to objectively establish such force qualifications) is damped by the plates (176, 178) without the teeth on the edges (172, 174) of the carriage coming into contact with the corresponding teeth (127) of the upper and lower contours. When this force is greater, meaning when it causes a very rapid and/or violent movement of the solar tracker, the impulsion thereof will overcome the elastic resistance provided by the pieces (176, 178) and the carriage (170) will be interlocked with the upper or lower contour of the rail (126). In the preferred embodiment of this suspension mechanism, the teeth (127) of both the contours of the guide rail (126) and the carriage (170) are in the shape of shark fins, although any other complementary shape can be used that guarantees an automatic passive locking and unlocking of the system, such as sawtooth, rectangular, curved teeth or any combination thereof.

The invention claimed is:
1. A passive locking system for solar trackers, comprising:
a connecting rod (110) that has a first end (112) fixed to a rotation profile (200) of a solar tracker in a pivotal manner, and a second end (114) comprising a pin (116) integral with the same,
a guide lock (120) fixed to a support post (300) and comprising an upper longitudinal edge (122) and a lower longitudinal edge (124) equidistant from each other along the entire length of the guide lock (120) and which further comprises an inner guide rail (126) in the form of a slot between the two upper (122) and lower longitudinal edges (124) and equidistant from both along the entire length of the guide lock (120), said guide rail (126) comprising teeth (127) in each of the two longitudinal contours of the rail (126) and with a separation between the teeth (127) of one contour and the opposite one, such that the separation between the teeth (127) of one contour and the opposite one allows the free passage of the pin (116) along the rail (126) during the rotational movement of the solar panel, and a suspension mechanism applied to the second end (114) of the connecting rod (110) such that the suspension mechanism absorbs a force in a direction substantially perpendicular to the longitudinal edges (122, 124) of the guide lock (120), the pin (116) remaining locked in the teeth when the absorption force of the suspension mechanism is exceeded.

2. The system according to claim 1, wherein the suspension mechanism comprises a slider (130) integral with the second end (114) of the connecting rod (110) and comprising, in turn, two upper (132) and lower guide wheels (134) arranged to roll, respectively, on the two upper (122) and lower longitudinal edges (124) of the guide lock (120) and connected to the slider (130) by elastic connection means such that they provide elasticity to the movement of the wheels (132, 134) in a direction substantially perpendicular to both longitudinal edges (122, 124) of the guide lock (120).

3. The system according to claim 2, wherein the elastic connection means comprise an upper wheel support (136) and a lower wheel support (138) able to be moved with respect to the slider (130) substantially perpendicularly to the two longitudinal edges (122, 124), and a spring connecting both upper (136) and lower wheel supports (138).

4. The system according to claim 2, wherein the elastic connection means comprise an upper wheel support (136) and a lower wheel support (138) able to be moved with respect to the slider (130) substantially perpendicularly to the two longitudinal edges (122, 124), and two springs respectively connecting the upper (136) and lower wheel supports (138) to the slider (130).

5. The system according to claim 3, in which at least one of the two upper (136) and lower wheel supports (138) comprises a C-shaped plate, such that:
the corresponding wheel (132, 134) is rotatably fixed to the intermediate section (184) of the "C";
a first terminal section (182) of the "C" ends in a "T" (186) coupled to a through slot (190) of the slider (130) and the "T" is slidable along the same;
a second terminal section (180) of the "C" comprises a through-slot (188) able to be coupled to a corresponding elongated projection (192) of the slider (130) and slidable along the same, the through-slot (190) and the elongated projection (192) sliding in a same substantially perpendicular direction to the longitudinal edges (122, 124) of the guide lock (120);
the corresponding spring is fixed at one of the ends thereof to the end of the second terminal section (180).

6. The system according to claim 1, wherein the suspension mechanism comprises:
an upper suspension plate (150), elongated, fixed at the upper end thereof to the second end (114) of the connecting rod (110) and such that the lower end thereof is in sliding contact with the upper longitudinal edge (122) of the guide lock (120) and made of a material that elastically absorbs a substantially upward force, and
an lower suspension plate (160), fixed at the upper end thereof to the second end (114) of the connecting rod (110) and such that the lower end thereof comprises an upward bend (162) that is in sliding contact with the lower longitudinal edge (124) of the guide lock (120) and made of a material that elastically absorbs a substantially downward force.

7. The system according to claim 6, wherein the upper suspension plate (150) comprises at least two bends (152, 154) of the upper suspension plate to facilitate the elastic absorption of a substantially upward force and the lower end thereof comprises an upward curvature (156) in sliding contact with the upper longitudinal edge (122), in the sense of a skate.

8. The system according to claim 6, wherein the lower suspension plate (160), in addition to the upward bend (162), comprises at least an additional bend (164) to facilitate the elastic absorption of a substantially downward force and the lower end thereof comprises a downward curvature (166) in sliding contact with the lower longitudinal edge (124), in the sense of a skate.

9. The system according to claim 1, wherein the suspension mechanism comprises a carriage (170) integral with the pin (116) and which comprises an upper edge (172) and a lower edge (174) with teeth suitable for interlocking with the teeth (127) of the guide rail (126) and with a distance between the tip of the teeth of the upper edge (172) and the tip of the teeth of the lower edge (174) that allows for the free passage of the carriage (170) throughout the length of the rail (126), and wherein the suspension mechanism comprises at least a C-shaped plate (176, 178) firmly fixed at the central part thereof to a corresponding end of the carriage (170) in such a way that the upper and lower parts of the "C" elastically impact against the upper and lower longitudinal contours of the guide rail (126), respectively, locking the carriage (170) with the pin (116) in the teeth (127) when the absorption force of the plate (176, 178) is exceeded.

10. The system according to claim 9, wherein the suspension mechanism comprises two plates (176, 178) firmly fixed at the central part thereof to each end of the carriage (170).

11. The system according to claim 1, wherein the guide lock (120) and the corresponding guide rail (126) have a curved or circular arc shape.

12. The system according to claim 1, comprising a lever element (140) firmly fixed at one end to the rotation profile (200) to rotate integrally with the latter, and pivotally fixed at the other end to the connecting rod (110).

13. The system according to claim 1, wherein the support post (300) is the support of the solar tracker itself.

14. A passive locking system for solar trackers, comprising:
a connecting rod (110) that has a first end (112) fixed to a rotation profile (200) of a solar tracker in a pivotal manner, and a second end (114) comprising a pin (116) integral with the same,
a guide lock (120) fixed to a support post (300) and comprising an upper longitudinal edge (122) and a lower longitudinal edge (124) equidistant from each other along the entire length of the guide lock (120) and which further comprises an inner guide rail (126) in the form of a slot between the two upper (122) and lower longitudinal edges (124) and equidistant from both along the entire length of the guide lock (120), said guide rail (126) comprising teeth (127) in each of the two longitudinal contours of the rail (126) and with a separation between the teeth (127) of one contour and the opposite one, such that the separation between the teeth (127) of one contour and the opposite one allows the free passage of the pin (116) along the rail (126) during the rotational movement of the solar panel, and
a suspension mechanism applied to the pin (116), such that the suspension mechanism absorbs a force in a direction substantially perpendicular to the longitudinal edges (122, 124) of the guide lock (120), the pin (116) remaining locked in the teeth when the absorption force of the suspension mechanism is exceeded.

15. A passive locking system for solar trackers, comprising:
- a connecting rod (110) that has a first end (112) fixed to a rotation profile (200) of a solar tracker in a pivotal manner, and a second end (114) comprising a pin (116) integral with the same,
- a guide lock (120) fixed to a support post (300) and comprising an upper longitudinal edge (122) and a lower longitudinal edge (124) equidistant from each other along the entire length of the guide lock (120) and which further comprises an inner guide rail (126) in the form of a slot between the two upper (122) and lower longitudinal edges (124) and equidistant from both along the entire length of the guide lock (120), said guide rail (126) comprising teeth (127) in each of the two longitudinal contours of the rail (126) and with a separation between the teeth (127) of one contour and the opposite one, such that the separation between the teeth (127) of one contour and the opposite one allows the free passage of the pin (116) along the rail (126) during the rotational movement of the solar panel, and
- a suspension mechanism applied to the second end (114) of the connecting rod (110) and to the pin (116), such that the suspension mechanism absorbs a force in a direction substantially perpendicular to the longitudinal edges (122, 124) of the guide lock (120), the pin (116) remaining locked in the teeth when the absorption force of the suspension mechanism is exceeded.

* * * * *